No. 711,614. Patented Oct. 21, 1902.
O. BRITZKE.
GAS BATTERY.
(Application filed Jan. 17, 1901.)
(No Model.) 3 Sheets—Sheet 1.
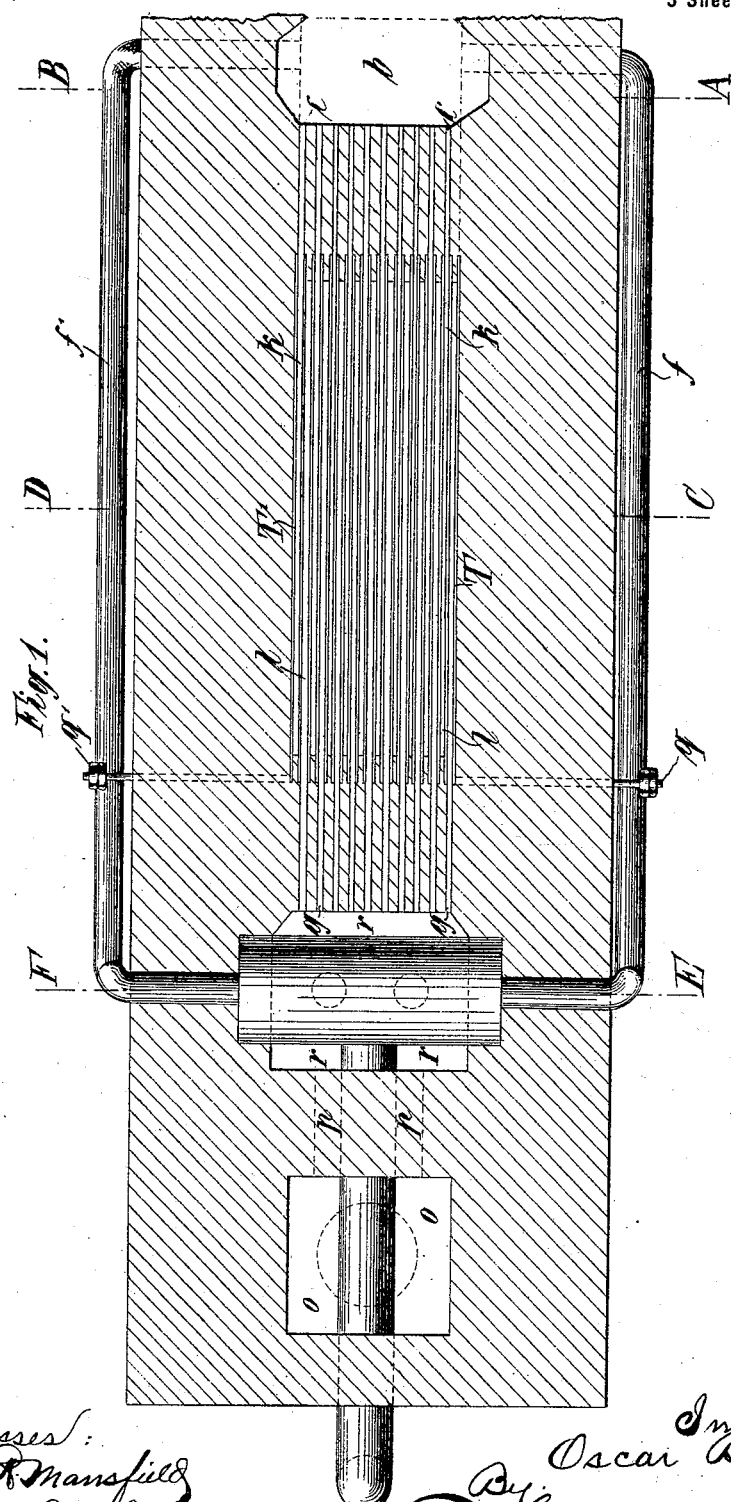

No. 711,614. Patented Oct. 21, 1902.
O. BRITZKE.
GAS BATTERY.
(Application filed Jan. 17, 1901.)
(No Model.) 3 Sheets—Sheet 2.
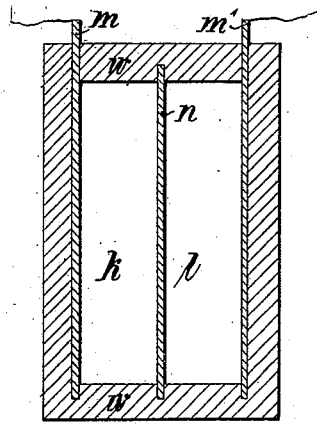
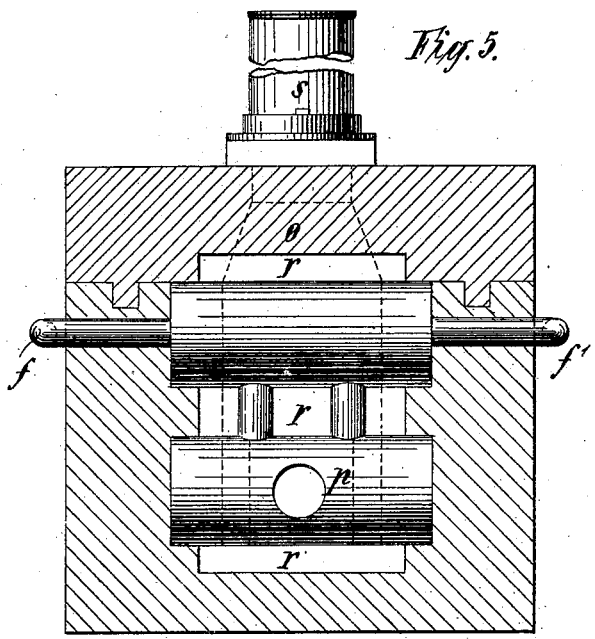
Witnesses:
James R. Mansfield
E. Ediv. Duffey
Inventor:
Oscar Britzke
By
Alexander & Dowell
Attorneys.

No. 711,614. Patented Oct. 21, 1902.
O. BRITZKE.
GAS BATTERY.
(Application filed Jan. 17, 1901.)

(No Model.) 3 Sheets—Sheet 3.

Witnesses:
James R. Mansfield.
C. Edw. Duffey.

Inventor:
Oscar Britzke.
By
Alexander & Dowell
Attorneys.

UNITED STATES PATENT OFFICE.

OSCAR BRITZKE, OF ST. PETERSBURG, RUSSIA.

GAS-BATTERY.

SPECIFICATION forming part of Letters Patent No. 711,614, dated October 21, 1902.

Application filed January 17, 1901. Serial No. 43,661. (No model.)

*To all whom it may concern:*

Be it known that I, OSCAR BRITZKE, a subject of the Czar of Russia, residing at St. Petersburg, in the Russian Empire, have invented certain new and useful Improvements in Gas-Batteries for Generating Electricity, of which the following is a specification.

My present invention relates to improvements in gas-batteries for the continuous generation of an electric current by the oxidation of carbon or other suitable material; and the object of my invention is to simplify the construction of such batteries.

Figure 3:
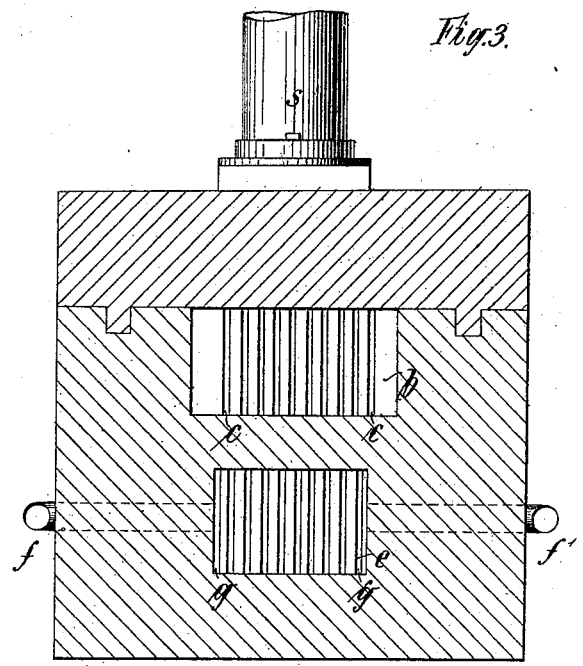
Figure 4:
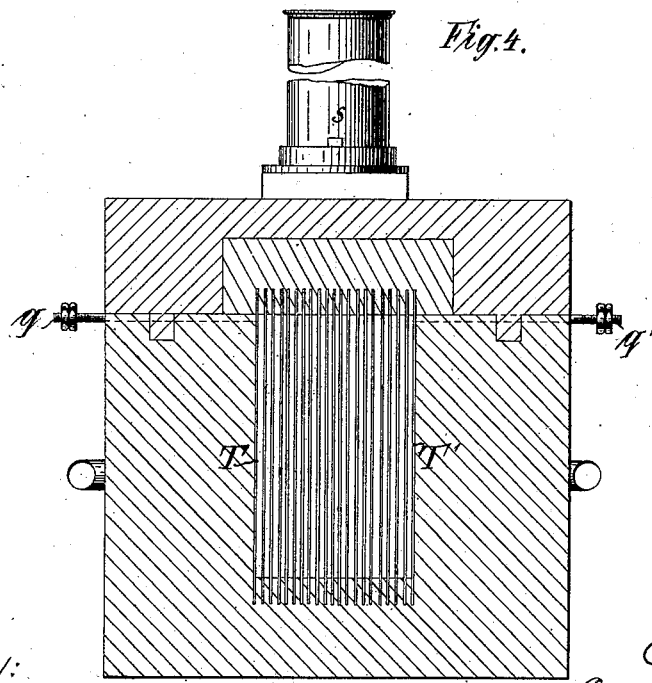

In the accompanying drawings, illustrating my invention, Figure 1 is a sectional plan of the entire battery; Fig. 2, a vertical section through the plates of a cell on an enlarged scale; Fig. 3, a vertical section on the line A B of Fig. 1; Fig. 4, a vertical section on the line C D of Fig. 1; Fig. 5, a vertical section on the line E F of Fig. 1.

My battery consists, essentially, of a number of separate cells, each containing two plates $m\ m'$, Fig. 2, capable of standing high heat and preferably non-oxidizable or but slightly so. Between these two plates is arranged a porous fireproof plate $n$, which is impregnated with an electrolyte that is easily reduced, oxidized, and melted. The quantity of this electrolyte is such as to remain in the pores of the plate without, however, increasing the electrical resistance too much. Between the plates $m$, $n$, and $m'$ are provided channels $k\ l$, through one, $k$, of which a hot gas, such as carbon monoxid or other easily-oxidized gas, is passed, and through the other, $l$, hot air, oxygen gas, or other gas containing oxygen, is passed. The temperature of these gases must be high enough to melt the electrolyte and to reoxidize the same, as well as to reduce the electrical resistance as far as possible. Hot gases, as is known, are good conductors of electricity, so that the gases in the passage or chamber K, together with the plate $m'$ in contact with them, form the anode, while the oxygen of the air or other gas containing oxygen in passage or chamber $l$, together with the other metal plate $m'$, forms the cathode. Each such cell constitutes a battery. The battery shown in the drawings comprises ten such cells. The metal plates $m\ m'$ and the electrolyte plates $n$ are held apart from each other by walls $w$ of a fireproof and non-conducting material, in this manner forming the channels or chambers $k\ l$, and in order to conserve the heat as much as possible the plates are inclosed on all sides by a structure of conducting material.

Near to the battery a generator for carbon monoxid or other suitable gas (not shown) is provided, and the gas from such generator is led through the channel $a$ into the chamber $b$, which is connected by narrow channels $c$ with the channels $k$. The chamber $b$, Fig. 3, is situate in the upper part of the apparatus, and underneath this chamber there is a second chamber $e$, separated from $b$ by a partition or wall of fireproof material. Through the tubes $f f'$, which are enveloped by an insulating material, hot air passes into the chamber $e$, and from thence through the narrow channels $g$ into the channels $l$.

The channels $k\ l$ are constructed as long and narrow as possible, being lined, as above stated, on opposite sides by the anode or cathode and electrolyte plates. The gases after leaving the channels $k\ l$ pass through the narrow exit-channels, like $g'$, into a common chamber $r$, from which they pass to flue $o$ and finally into the chimney $s$, the consumed air passing through the channels $g'$ at the same level as the channels $c$ and the consumed generator-gases through channels underneath the former and at the same level as the channels $g$.

In the chamber $r$ there is an apparatus for heating the air by means of the exhaust-gases. This apparatus consists, preferably, of two metal drums connected together, as shown in Fig. 5.

The two outermost metal plates (marked T T' in Figs. 1 and 4) are provided with terminals $q\ q'$, to which the conductor-wires are attached. Each inner plate $m\ m'$ (of which there are nine in the apparatus illustrated) is common to two cells and serves, first, to separate the cells from each other, and, secondly, to provide a conductor between said cells. To enable the exchange of the plates, the upper part of the apparatus is removable, and to avoid injuring the electrolyte-plates a cover of lighter material is provided which extends over and rests on all the plates. The upper part $o$ can be secured to the body of the battery by iron clamps, and the whole apparatus may eventually be inclosed on iron.

The electrolyte-plates $n$ in my apparatus can be made of so-called "uralite," a material prepared from asbestos and silicic acid, which are impregnated with the electrolyte. Uralite can also be used for lining the whole battery. For the electrodes silvered copper plates can be employed.

The operation of my improved battery is as follows: As soon as the electrolyte—for instance, oxid of lead—is melted by the hot gases passing through the channels or chambers $k$ $l$ an electric current is generated. The carbon monoxid, for example, in the channel $k$ is converted at the expense of the electrolyte into carbon dioxid. The oxygen consumed in this way in the electrolyte is replaced by the oxygen of the gas in the other channel $l$, and because both gases are fed continuously an uninterrupted current of electricity is generated. This battery may be used as a single cell or as a combination of cells, as in the example described. In practice the combination of the cells will be found preferable because more economical.

The electromotive force and current vary according to the size and thickness of plates, the distance therebetween, the amount of electrolyte used, the quality of material, and the temperature. Therefore the current and its intensity will vary according to variations in the several elements employed and the conditions of use.

What I claim, and desire to secure by Letters Patent, is—

1. In a gas-battery, the combination of a cell of refractory material having metal plates on opposite sides within said cell, and a plate impregnated with an electrolyte dividing the space between the plates into two passages or channels; with means for circulating hot gases through said passages, for the purpose and substantially as described.

2. A gas-battery for generating the electric current, comprising in combination a number of battery-cells each having parallel channels or chambers respectively for the passage of a hot, easily-oxidized gas and of a hot gas containing oxygen; a metal plate impregnated with an electrolyte separating the channels from each other; and metal electrodes separating the cells from each other, substantially as described.

3. A gas-battery for generating the electric current, comprising in combination a number of battery-cells each having parallel channels or chambers $k$, $l$, respectively for the passage of a hot, easily-oxidized, gas and of a hot gas containing oxygen; a metal plate impregnated with an electrolyte separating the channels from each other; and metal electrodes separating the cells from each other; a chamber $b$ at one end of the battery in communication with a gas-generator, into which all the channels $k$ open; a chamber $e$ underneath the chamber $b$ into which the channels $l$ open; a chamber $r$ at the other end of the apparatus into which all the channels open, and terminals connected to the outermost electrodes, all substantially as and for the purpose set forth.

In testimony whereof I have hereunto set my hand in the presence of two witnesses.

OSCAR BRITZKE.

Witnesses:
H. LOVIAGUINE,
H. STAPLE.